US00RE36923E

United States Patent [19]

Hiroi et al.

[11] E Patent Number: Re. 36,923

[45] **Reissued Date of Patent: *Oct. 24, 2000**

[54] SHEET STAPLER

[75] Inventors: Masakazu Hiroi; Koichi Murakami, both of Yokohama; Yuji Takahashi, Tokyo, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/506,957

[22] Filed: Jul. 27, 1995

Related U.S. Patent Documents

Reissue of:

[64] Patent No.: 5,230,457
Issued: Jul. 27, 1993
Appl. No.: 08/007,033
Filed: Jan. 21, 1993

U.S. Applications:

[63] Continuation of application No. 07/830,526, Feb. 4, 1992, abandoned, which is a continuation of application No. 07/698,339, May 7, 1991, abandoned, which is a continuation of application No. 07/271,424, Nov. 15, 1988, abandoned.

[30] Foreign Application Priority Data

Nov. 16, 1987 [JP] Japan ..... 62-290293
Dec. 2, 1987 [JP] Japan ..... 62-305407

[51] Int. Cl.[7] ..... B27F 7/36

[52] U.S. Cl. ..... 227/2; 227/6; 227/131; 355/324

[58] Field of Search ..... 227/2, 5, 6, 7, 227/131; 355/323, 324

[56] References Cited

U.S. PATENT DOCUMENTS

| | | | |
|---|---|---|---|
| 3,041,618 | 7/1962 | Ruskin et al. | 227/2 |
| 3,058,117 | 10/1962 | Moore | 227/2 |
| 3,278,101 | 10/1966 | Hatazaki | 227/7 |
| 4,421,264 | 12/1983 | Arter et al. | 227/2 |
| 4,542,844 | 9/1985 | Olesen et al. | 227/7 |
| 4,558,391 | 12/1985 | Ward et al. | 227/131 X |
| 4,573,625 | 3/1986 | Olesen et al. | 227/131 |
| 4,623,082 | 11/1986 | Kurosawa | 227/7 |
| 4,625,291 | 11/1986 | Hormann | 364/550 |
| 4,770,334 | 9/1988 | Hoshi et al. | 227/85 |
| 4,864,350 | 9/1989 | Ishiguro et al. | 355/311 |

FOREIGN PATENT DOCUMENTS

| | | |
|---|---|---|
| 245086 | 11/1987 | European Pat. Off. . |
| 3726406 | 2/1988 | Germany . |
| 50-1318 | 1/1975 | Japan . |
| 54-42086 | 4/1979 | Japan . |
| 1003623 | 9/1965 | United Kingdom . |
| 1358212 | 7/1974 | United Kingdom . |
| 2010957 | 7/1979 | United Kingdom . |
| 2187174 | 9/1987 | United Kingdom . |
| 2189906 | 11/1987 | United Kingdom . |

*Primary Examiner*—Scott A. Smith
*Attorney, Agent, or Firm*—Fitzpatrick, Cella, Harper & Scinto

[57] ABSTRACT

A sheet stapling apparatus including a stapling device for stapling a set of sheets, a load detecting device for detecting a level of a load of the stapling device during a stapling operation, and a signal generating device for generating a signal when the load detected by the load detecting device is outside a predetermined range.

34 Claims, 15 Drawing Sheets

SHEET STAPLER

Matter enclosed in heavy brackets [ ] appears in the original patent but forms no part of this reissue specification; matter printed in italics indicates the additions made by reissue.

This application is a continuation of application Ser. No. 07/830,526 filed Feb. 4, 1992, which is a continuation of application Ser. No. 07/698,339 filed May 7, 1991, which is a continuation application of Ser. No. 07/271,424 filed Nov. 15, 1988, now all abandoned.

FIELD OF THE INVENTION AND RELATED

The present invention relates to a sheet stapler for stapling sheets.

An example of a conventional electric stapler is disclosed in U.S. Pat. No. 4,573,625, and comprises a staple cartridge containing a number of staples connected in the form of a belt or strip, a stapling section for stapling the sheets with the staples and a driver such as a motor for driving the stapling section, wherein the sheets brought into the stapling section are stapled using the motor.

However, the electric stapler disclosed in U.S. Pat. No. 4,573,625 is not provided with any detecting means for detecting staple jam, a blank shot resulting from failure of the staple feed or the like.

The driver in the form of a motor or the like of the electric stapler is occasionally imposed with a load beyond its capacity and is stopped sometimes, when, for example, to many sheets are attempted to be stapled at once, when a staple shoots an already stapled portion, or when thick or hard sheets are stapled. In this case, the stapler is stopped while gripping the sheets, and therefore, the operator has to manipulate the driver to release the gripped sheets, thus requiring cumbersome work. Particularly, when the stapler is operated with a sorter or the like for continuously processing the sheets, the continuous processing operation is interrupted by the stopping of the stapler, and therefore, the operational efficiency is decreased.

In such a stapler, a leading edge of a strip of a series of staples does not reach the stapling means immediately after the staple cartridge is exchanged, and therefore, the stapling operation is not possible, if the stapler is operated as it is. Therefore, the operator has to carry out a pre-feeding operation in which the blank shots are repeated several times until the leading edge of the strip comes to the stapling position. The pre-feeding operation is tiring work in which the stapling switch is simply repeatedly depressed. In addition, it is unknown to the operator how many blank shots are required, and therefore, the blank shots have to be executed with some sheets set in the stapling station, since otherwise the staple jam will occur. Thus, the pre-feeding operation is very cumbersome.

The blank shot can occur by a malfunctioning of the staple feeding means. Particularly, when the blank shot occurs in a stapler interrelated with an image forming apparatus such as a copying machine to sequentially staple sets of sheets discharged therefrom, the sheets can be scattered or can be jammed.

SUMMARY OF THE INVENTION

Accordingly, a principal object of the present invention is to provide a stapler provided with means for detecting malfunction of the a staple such as a staple jam or a blank shot.

It is another object of the present invention to provide a stapler wherein a predetermined overload of the driver for the stapler is detected, and the driver drives in a reversed direction before the driver stops to retract the stapling station, by which the problems described above are eliminated.

According to the present invention, there is provided a stapler comprising staples for stapling sheets, a hammer movable between a stapling position for stapling the sheets and a non-operative position, a driver for driving the hammer, an overload detecting means for detecting a predetermined overload produced in the driver for the hammer, and reversing means, responsive to detection by said overload detecting means, for reversing the driver to retract the hammer from the stapling position to the non-operative position.

In this stapler, when the sheets are set in the stapling position, the hammer is moved and staples the sheets. Upon the stapling operation by the hammer, if the driver for the hammer is imposed with a load which is larger than a predetermined load, for example, more than a tolerable number of sheets being set, the overload is detected by the overload detecting means. In response to the detection, the driver is controlled by the reversing means, and is rotated in the reverse direction to retract the staple hammer so from the stapling position.

A further object of the present invention is to provide a stapler wherein the cumbersome prefeeding operation is eliminated, or wherein a problem resulting when the set of sheets to be stapled is not actually stapled is corrected.

According to another embodiment of the present invention, there is provided a stapler comprising means for sequentially stapling set of sheets with a staple at a leading edge of a strip of staples, and means for feeding the strip of staples by a predetermined distance for each of the stapling actions, load detecting means for detecting the load of the stapling means upon the stapling action, and control means for allowing the stapling operation by said stapling means and the feeding operation by said feeding means when the load detected by the load detecting means is not more than a predetermined load. Therefore, if a blank shot occurs, the stapling operation is repeated until the sheets are actually stapled.

Accordingly, even when a fresh strip of needles are loaded, normal operation begins and the pre-feeding operation is automatically executed. Also, even if the blank shot occurs due to the malfunction of the strip feeding, the stapling operation is repeated until the staple is actually shot. Therefore, if the malfunction of the feeding means is cleared in the subsequent feeding, the stapling operation is performed without interruption.

These and other objects, features and advantages of the present invention will become more apparent upon consideration of the following description of the preferred embodiments of the present invention taken in conjunction with the accompanying drawings.

DETAILED DESCRIPTION OF THE PREFERRED EMBODIMENTS

Figure 2:
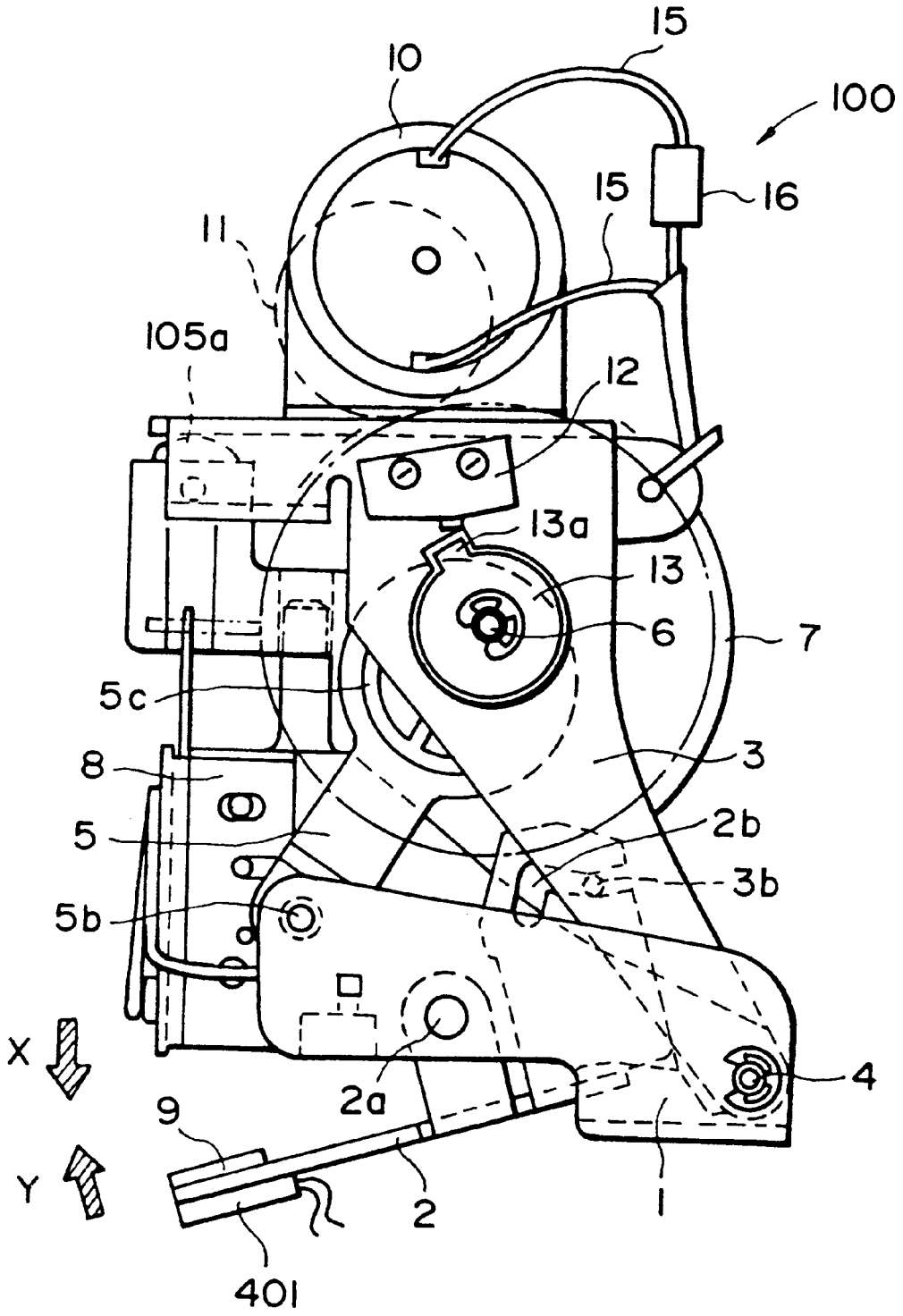
FIGS. 2 and 3 illustrate structures of the stapler according to the embodiment of the present invention.
Figure 3:
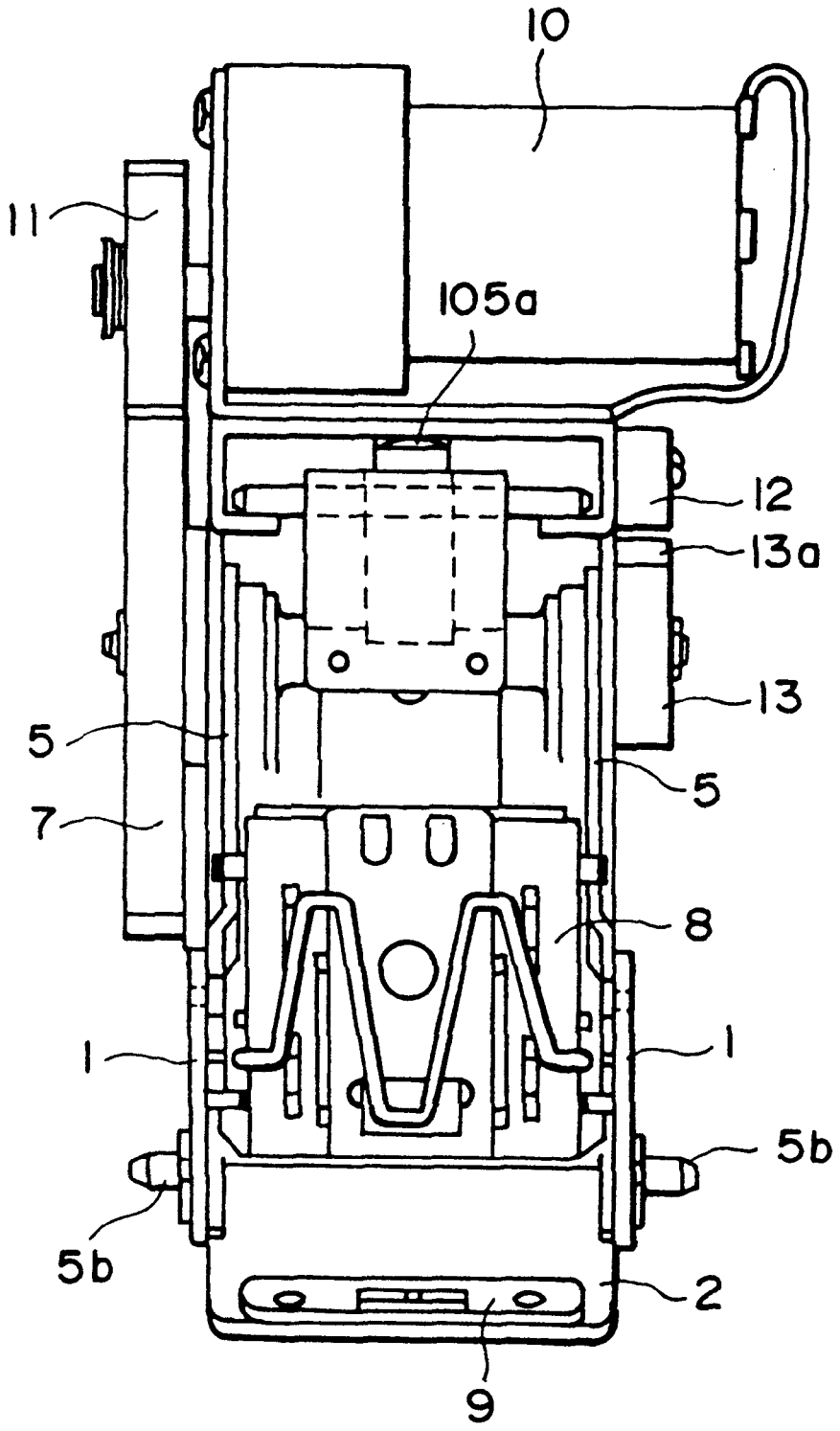

Referring first to FIGS. 2 and 3, there are shown front and side views of a stapler according to an embodiment of the present invention. As shown in FIG. 2, the stapler 100 includes a base 1 which is fixed, a lower jaw 2 rotatable about a pin 2a and an upper unit 3. At an end of the lower jaw 2, a channel-shaped cam 2b is formed and is engaged with a cramping pin 3b fixed to the upper unit 3. The upper unit 3 is swingably supported on a hinge pin 4 mounted to the base. A crank arm 5 is rotatably supported on a part of base 1 by a pin 5b adjacent an end of the crank arm 5. The other end thereof is engaged with a cam plate 5c fixedly and eccentrically mounted to a drive shaft 6. When a stapler gear 7 rotates through one full turn, the cam plate 5c rotates about the pin 6. At this time, since the base 1 is fixed, and since the distance between the pin 5b and the pin 6 is constant, the upper unit 3 rotates about the hinge pin 4 relative to the base 1. Also, a body 8 is pushed by a head 105a of the driver mounted to the body and is rotated in the direction x about the hinge pin 4 (the body 8 is rotatably supported by the hinge pin 4). Simultaneously, by the channel cam 2b of the lower jaw 2 engaged with the cramping shaft 3b of the upper unit 3, the lower jaw 2 rotates in the direction Y about the pin 2a. The base 1 is provided with an anvil 9 for bending the legs of the staple toward each other.

Above the upper unit 3, there is a motor which is a driving source for the stapler mechanism, the driving force thereof is transmitted to a stapler gear 7 through a motor gear 11. A home position sensor 12 includes a microswitch for detecting the stapler 100 being placed at its home position wherein the stapler 100 is waiting for its operation, that is, the body 8 and the lower jaw 2 are spaced apart. Together with the stapler gear 7 rotating through one full turn, the sensor cam 13 rotates through one full turn, and a projection 13b of the sensor cam 13 actuates the microswitch 12, by which the home position of the stapler 100 is detected. Thus, one full turn of the stapler gear 7 corresponds to one stroke of the stapling operation. The motor 10 is supplied with driving current 5 through a wire 15.

Load detecting means in the form of a current sensor in this embodiment detects the current through the wire 15. The current sensor 16 is fixed on an unshown base.

Figure 4:
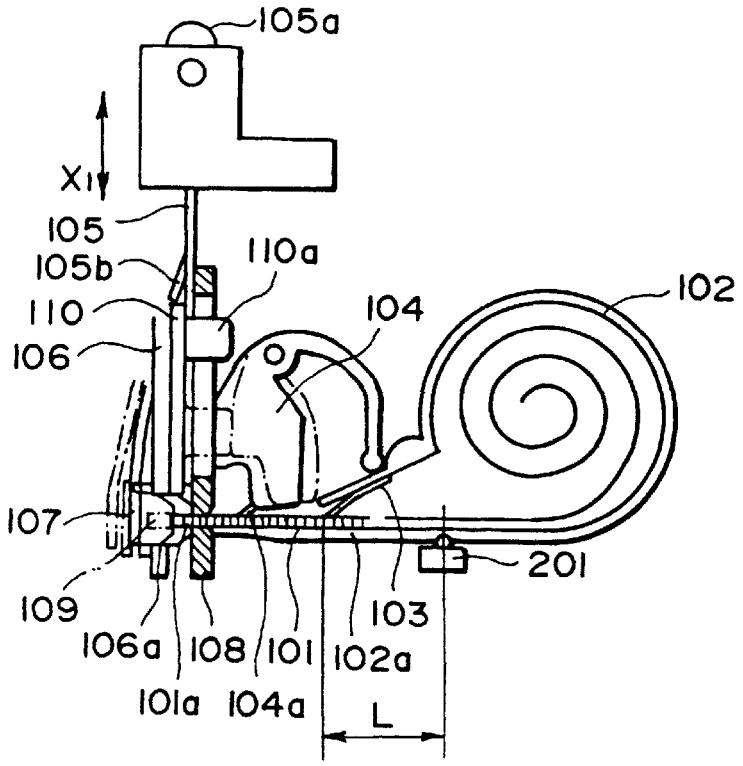
FIGS. 4 and 5 illustrate major parts of the stapler.
Figure 5:
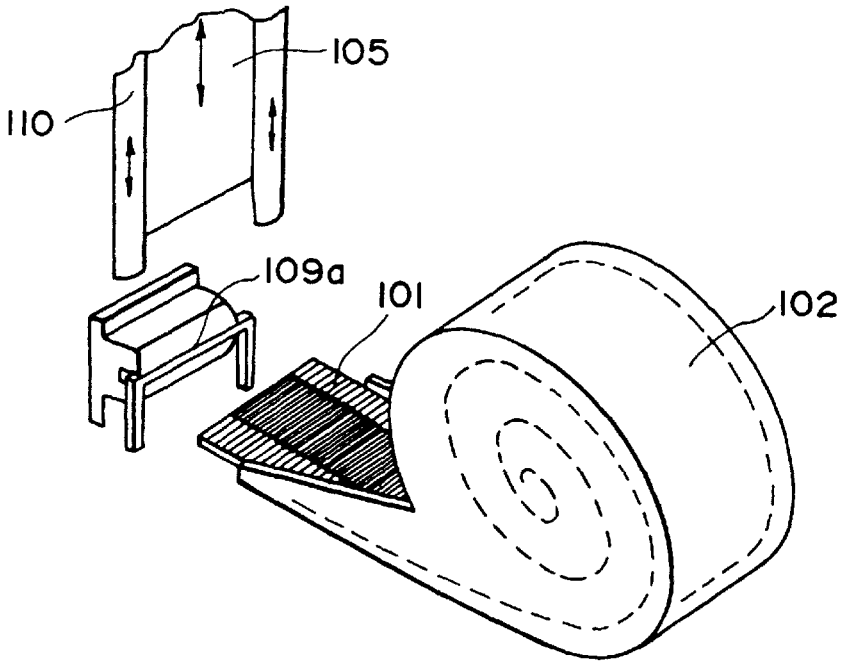

Referring to FIG. 4, the stapler feeding and a stapling mechanism will be described. FIG. 4 is a detailed sectional view of staple feeding and staple bending stations in the body 8. Designated by a reference 101 is staples, and individual staples are bonded at their centers. To constitute a strip containing the staples, the strip is accommodated in a cartridge 102. The mechanism includes movement confining means fixed in the cartridge and is in the form of a leaf spring and urges the strip of the staples to a guiding portion 102a of the cartridge 102 with proper contact pressure, thus guiding it. A driver or hammer 105 is effective to separate the bonded staples one by one and penetrate it through the sheets to reach the anvil 9. The head 105a of the driver 105 is in contact with the upper unit 3 as described in the foregoing. Therefore, when the upper unit 3 rotates, the driver head 105a is pushed downwardly in a direction indicated by X1 in FIG. 4.

Referring to FIG. 4, the end edge 101a of the strip is held at its central portion by the groove 109a of the staple bending block 109. When the driver head 105a moves down, the bending block 110 for bending the staple into a channel shape moves down simultaneously. Thus, the block 110 abuts opposite ends of the staple, which is actually in the form of a needle, and bends it into a channel shape to form a staple. When the driver head 105a is further pushed, a projection 110a of the bending block 110 pushes a staple feeding member 104 (staple feeding means) rotatably supported on a pin 104a, by which the staple feeding member flexes a spring 104b to move to a position indicated by chain lines. Then, a staple feeding pawl 104a moves in a direction opposite to the staple feeding. However, the first staple 101a has already been bent into the channel shape, and therefore, it is not moved in the opposite direction, and only the feeding pawl moves in that direction, so that it is prepared for the next staple feeding operation. Thereafter, the driver head 105a is moved further downwardly, a block urging pawl 105b of the driver 5 is disengaged from the upper part of the bending block 110, and only the driver 105 moves downwardly. Thus, the leading edge 105a of the driver reaches a tapered portion of the bending block 109. With further downward movement thereof, it pushes the bending block 109 supported in the opening 106a of the block guide 106 toward the position indicated by the chain lines (flexing the confining spring 109), and cooperates with a stapler cutter 108 to cut out the first staple now bent into a channel shape, and penetrates the staple 101a into the sheets. After the sheets are stapled in this manner, the driver head 105a is returned to its upper position, and the projection 110a is disengaged from the member 104 and the needle feeding pawl 104a is returned to its home position. With this, the strip is advanced.

The staple feeding and the stapling operations are performed through this stroke.

Figure 6:
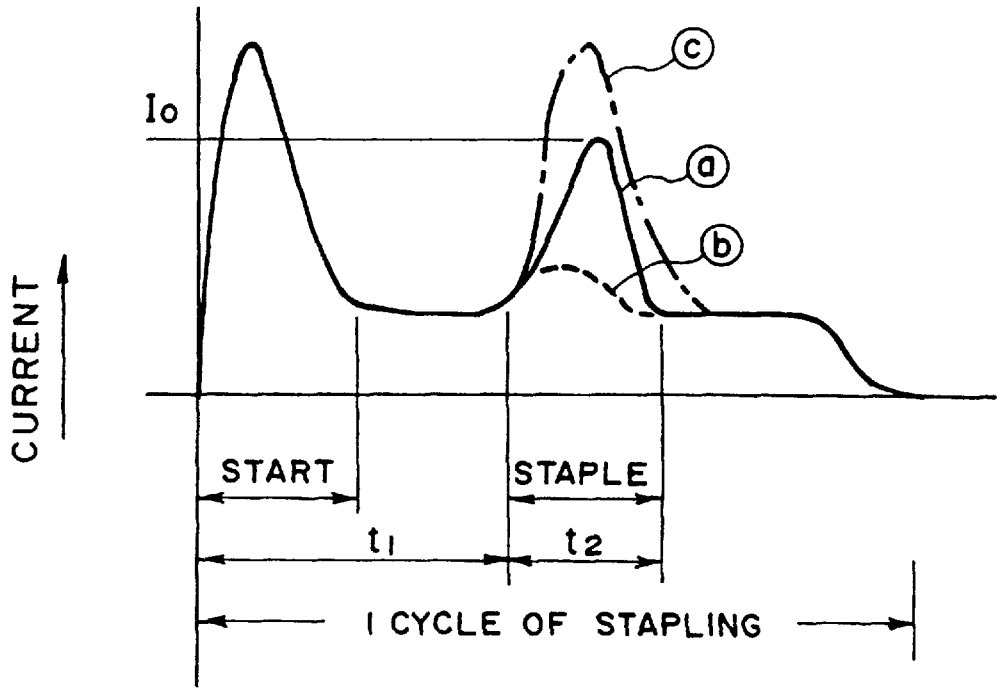
FIG. 6 is a graph showing an output of a current sensor.

FIG. 6 is a graph of a current through the motor 10 in one cycle of the stapling operation, detected by the current sensor 16.

In this Figure, "a" indicates the current when the staple is correctly fed and is correctly penetrated into the sheet; "b" indicates the current upon blank shot in which no staple is dispensed when the stapler is operated. Since with a blank shot, there is no load for bending and penetrating the staple, the level of the current is low; and "c" indicates the current upon malfunction or staple jam or the like, in which an overload is generally produced with the result of extremely high level of the current.

In this embodiment, the stapling operation is deemed as being normal when the current is 10 (initial set on level); when I>IO+C(C: variation), it is deemed that staple jam, malfunction of the stapling operation or a problem in the stapling mechanism occurs; and when I<IO−C, it is deemed that the blank shot occurs.

In FIG. 4, a reference numeral 201 designates a sensor for detecting the presence or absence of the staples.

Figure 1:
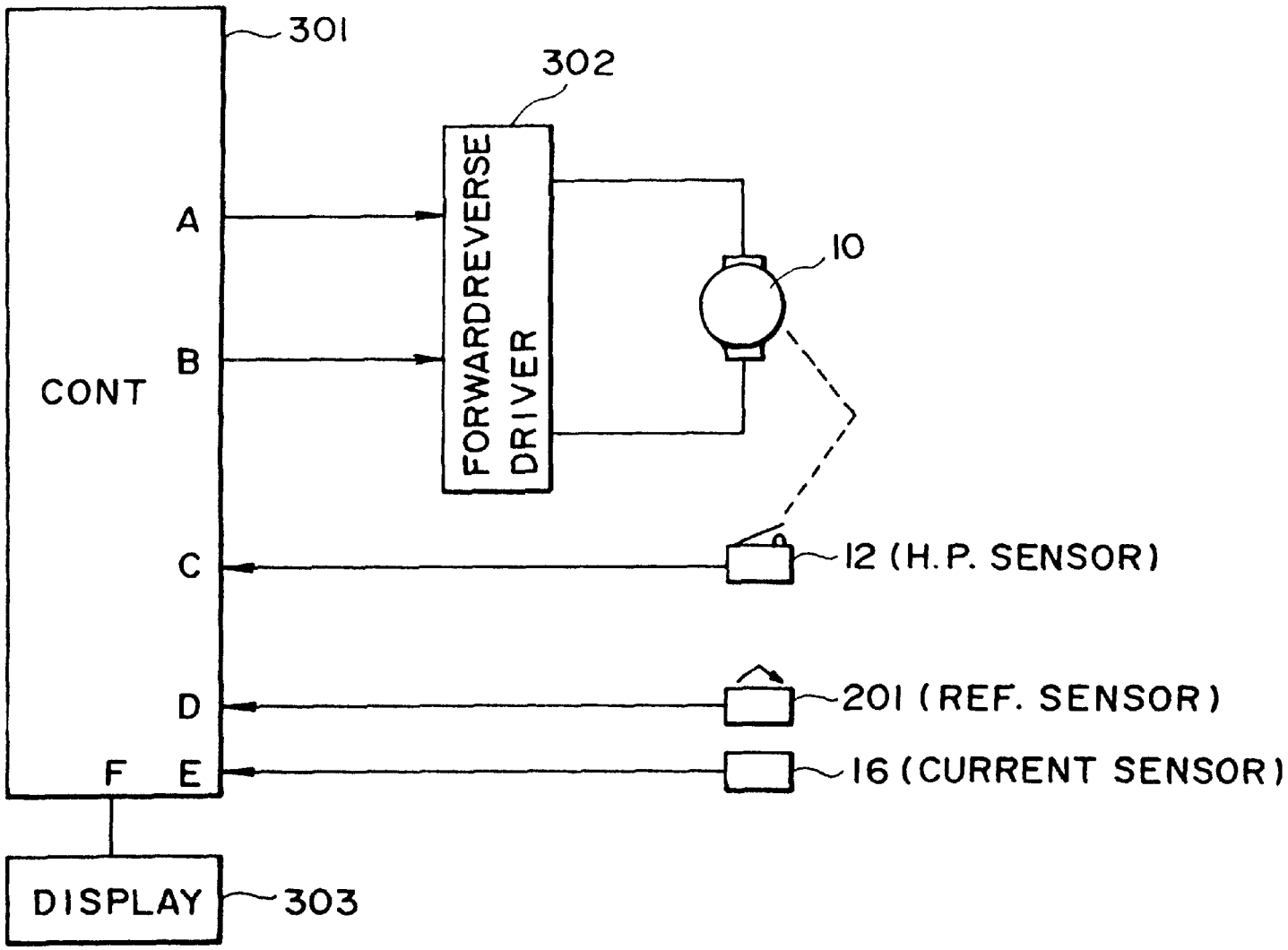
FIG. 1 is a block diagram illustrating a control of a stapler according to an embodiment of the present invention.

Referring now to FIG. 1 which is an electric block diagram, the control of the stapler of this embodiment will be described.

The control system includes control means, or more particularly, a control circuit 301 which is in this embodiment a known microcomputer including a programmed sequential control. The control circuit 301 is provided with output terminals A and B for rotating the motor 10 in the forward and backward directions, respectively. The outputs therefrom are transmitted to a forward-reverse driver 302. When an output is produced at the terminal A, a normal stapling operation is effected, whereas when an output is produced at the terminal B, a reversed drive is performed. When the stapler is at the home position, the home position sensor 12 is in an on state, and it is transmitted to a terminal C of the control circuit 301. Irrespective of whether the motor is rotated in the forward or backward direction, when a signal is produced from the home position sensor, both of the terminals A and B of the control circuit 301 are rendered off, so that the motor 10 stops. The lower jaw 2 of the stapler is always placed adjacent the bottommost position as shown in FIG. 2, when the motor 10 is stopped. Thus, the stapling operation is assured, and the recovery work after the reverse rotation is made easier.

An output of a reflection type sensor 701 is transmitted to a terminal D of the control circuit 301 in the form of an analog signal, and therefore, the microcomputer used has a function of converting an analog signal to a digital signal.

A terminal E receives a detection signal from the current sensor 16. Since the detection signal of the current sensor 16 is in the form of an analog signal, it is converted to a digital signal in the control circuit 301. If the microcomputer not having such a conversion function is used, an AD converter is used to provide the microcomputer with a digitalized signal.

The control circuit 301 monitors the signal from the current sensor 16, that is, the current I through the motor. More particularly, when Ip>IO+C, a problem in the stapling operation is deemed to be occurring, whereas when Ip<IO−C, a blank shot is deemed to be occurring, where Ip is a peak of the current between time $t_1$ which is a predetermined period after start of the stapling operation and time $t_2$ which is a predetermined period after the time $t_1$.

Terminal F transmits a display signal to a display device 303 so that the trouble in the stapling mechanism is displayed in response to the display signal.

Figure 7:
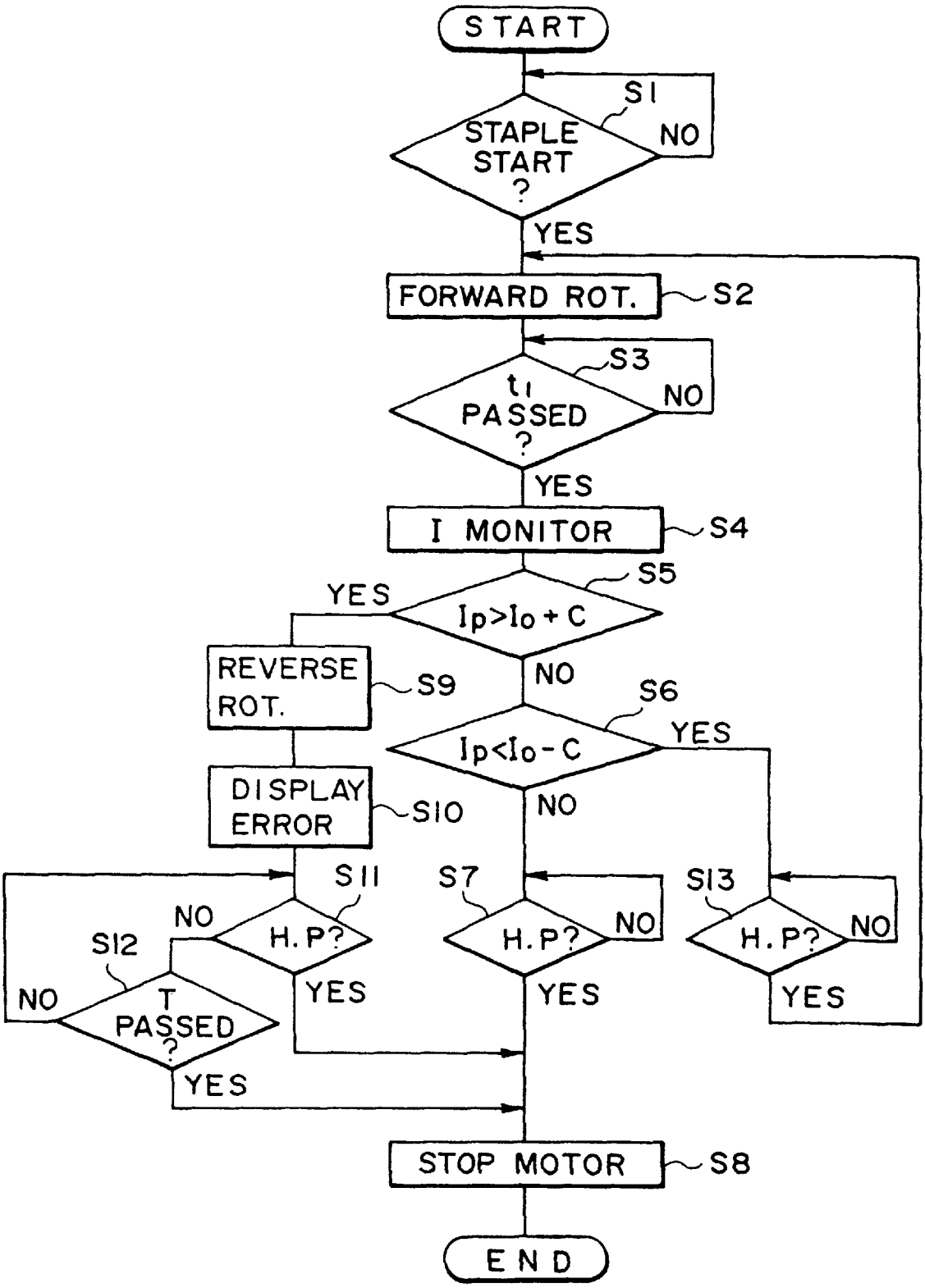
FIG. 7 is a flow chart illustrating the operation of the stapler according to the embodiment of the present invention.

Referring to FIG. 7 which is a flow chart, the operation will be described.

At step S1, start of the stapling operation is discriminated, at step S2, the terminal A produces an on signal so that the motor is rotated forwardly. At step S3, the discrimination is made as to whether or not the predetermined period $t_1$ has passed from the start of the stapling operation. If so, the current I through the motor 10 is monitored on the basis of the input to the terminal E, at step S4 to determine the peak current level Ip. At steps S5 and S6, the discrimination is made as to whether or not the current level Ip is normal, that is, whether or not the load of the motor is normal. If it is normal, at step S7 the home position of the stapler is confirmed, and the motor 10 is stopped.

If Ip>IO+C at step S5, that is, if the current level Ip is excessively high, it means that staple jam or the like occurs. Therefore, the output of the terminal A is rendered off, and the output of the terminal B is rendered on to rotate the motor 10 in the reverse direction at step S9.

Further, at step S10, the malfunction of the stapler is displayed on the display device 303. At step S11, the home position of the stapler is confirmed, and then the motor 10 is stopped. When the stapler is not returned to the home position even if a predetermined period T has passed after the reverse rotation of the motor 10, it is discriminated that the stapler is stopped on its way home by the staple jam, and therefore, the sequence goes from the step S12 to the step S8 to stop the motor.

Another embodiment of the present invention will be described which is advantageously usable with a general electric stapler, but it is particularly advantageous when it is used in a finisher or a sorter an automatic stapler connected with a copying machine or the like.

In this embodiment, the current level in the stapling operation is used for discrimination of the actual stapling or blank shot. However, a voltage level of the motor may be used, and as another alternative, a blank shot can be detected by a load cell 401 (FIG. 2) mounted to the stapler which is effective to discriminate whether or not an impact load is produced.

Figure 8:
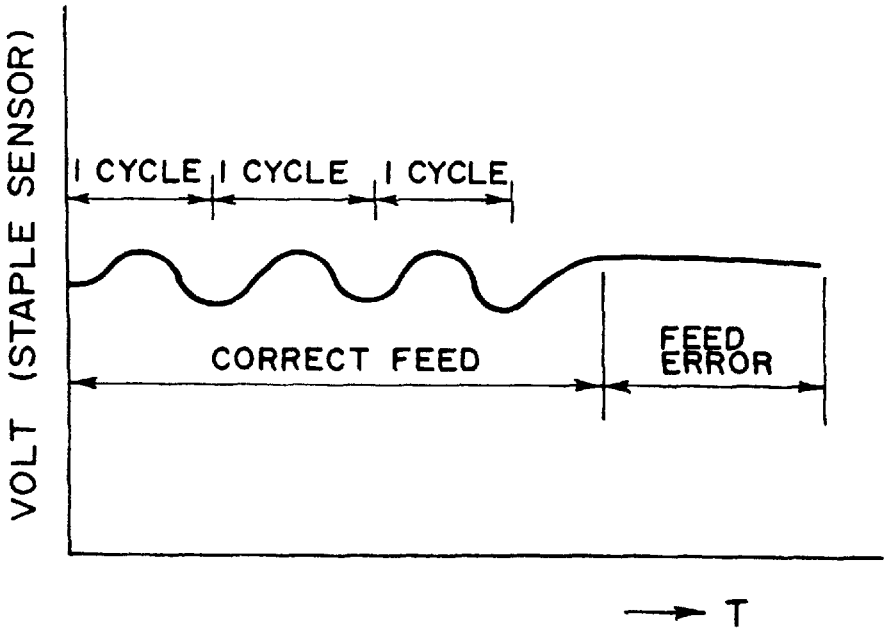
FIG. 8 is a graph showing a detection output of a reflection type sensor.

As a further alternative means, use can be made with the reflection type sensor 201 which is provided to detect the staples, and the comparison is made between the waveform of the voltage level when the staple is correctly fed and the waveform when the staple is erroneously fed (FIG. 8). Upon normal feeding, the output from the sensor is in the form of a wave shown in this Figure because the output decreases at each of the seams. However, when the staple is not fed correctly, the output from the sensor does not change. Thus, erroneous stapling feeding can be detected.

When erroneous staple feed is discriminated, a trouble signal is produced, and the apparatus is stopped, or it is possible that the stapling operation is repeated, in consideration of the fact that the failure of the staple feeding means with the high possibility that the next staple does not reach the stapling position, and that the next is a blank shot.

Figure 9:
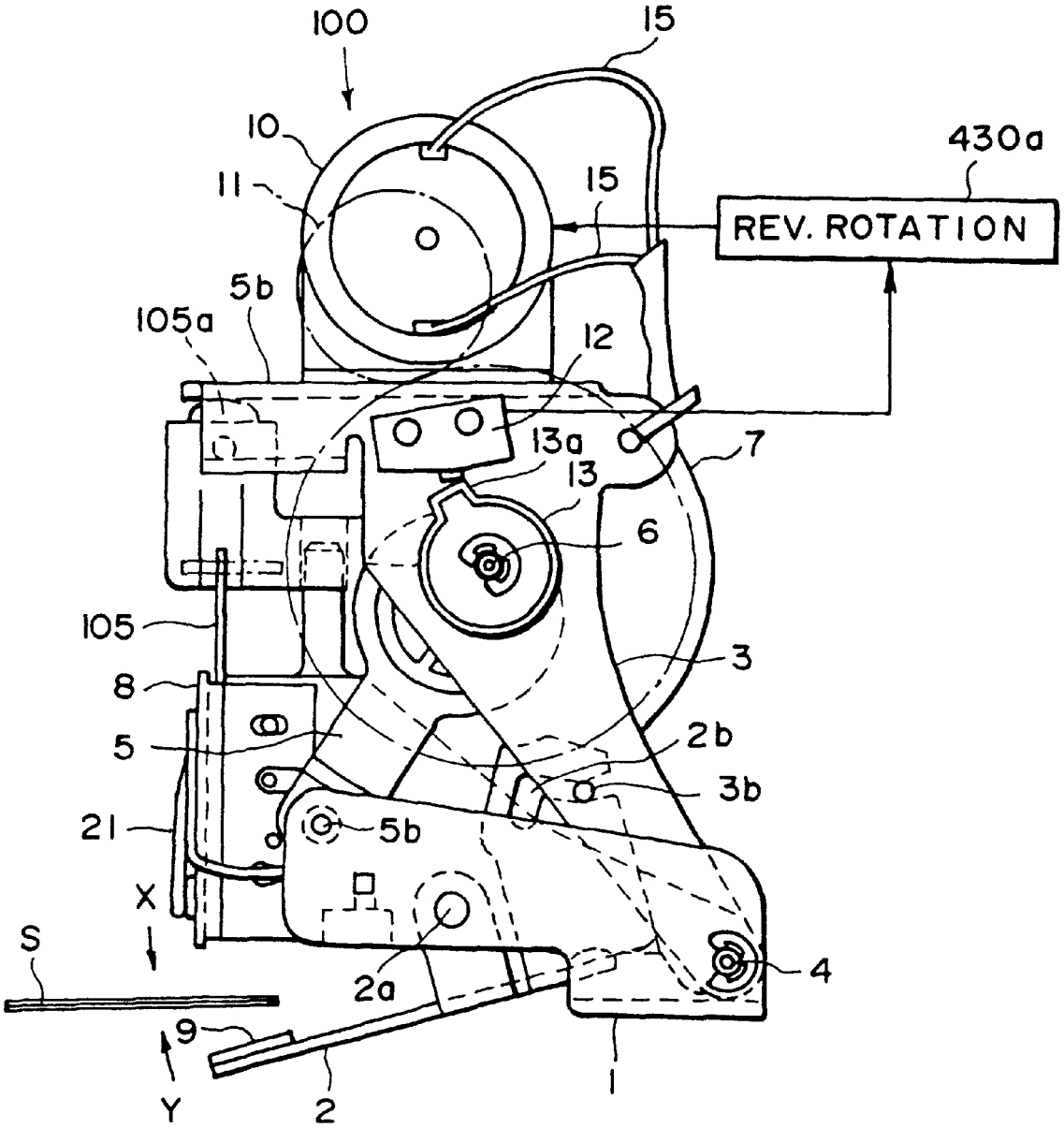
FIG. 9 shows structures of a stapler according to another embodiment of the present invention.
Figure 10:
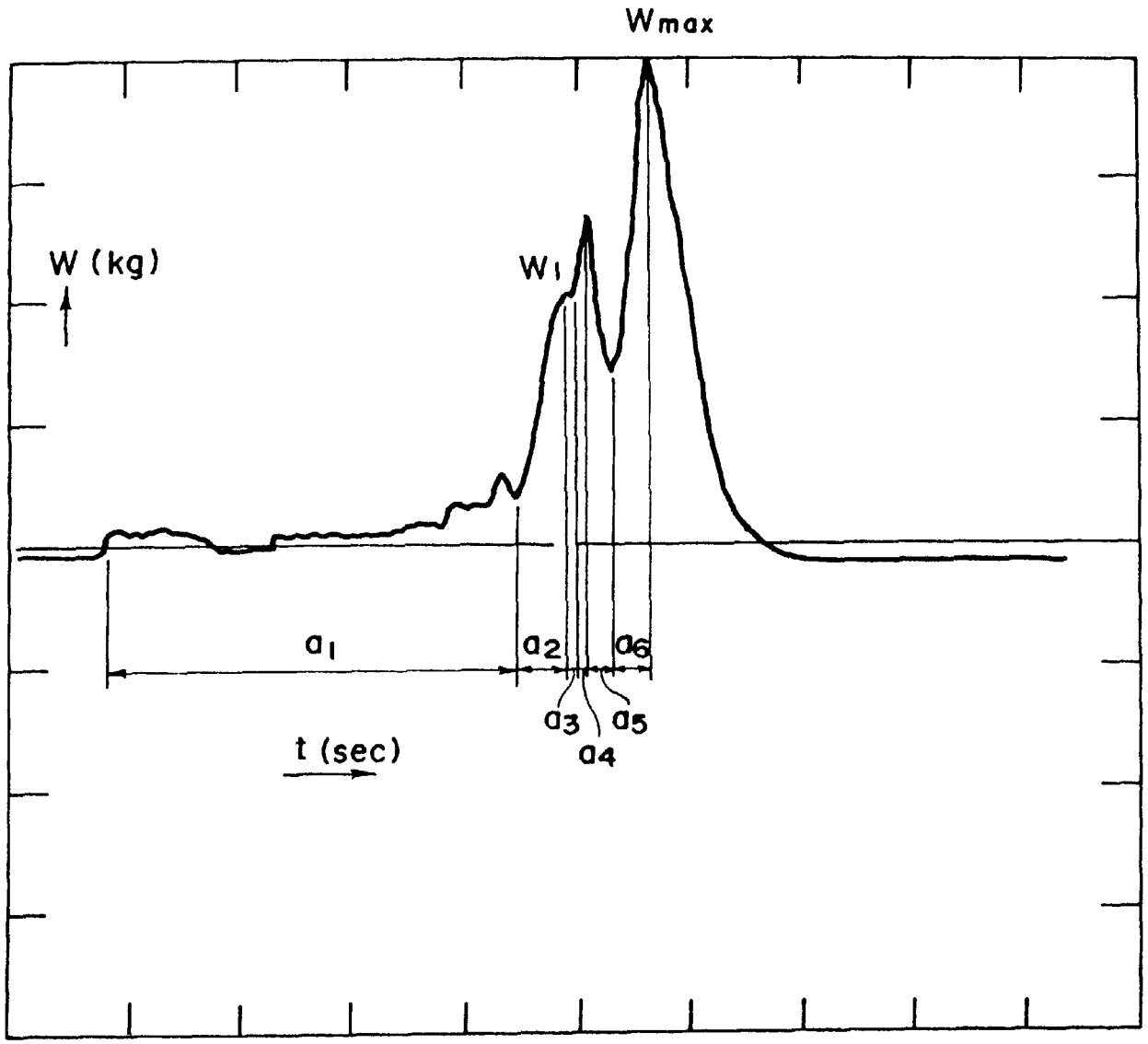
FIG. 10 is a graph showing a load in the stapling operation.

Referring to FIG. 9, a further embodiment of the present invention will be described wherein a problem with the stapler mechanism is detected using the home position sensor. In FIG. 9, the same reference numerals as in FIG. 2 are assigned to the corresponding elements. The force required for rotating the stapler gear 7 in FIG. 9 changes as shown in FIG. 10. The force required in the time period $a_2$ until the penetration of the staple 109a through the sheets S varies depending on the material, thickness and number of the sheets S, and the maximum force W1 when the staple 109a penetrates through the sheet S also changes. When, for example, the maximum force W1 when the staple penetrates through the sheets S exceeds a maximum force Wmax required for bending the legs of the staple 109a by the anvil 9 and the hammer, there is a possibility that it ca not be bent by the maximum power of the motor 10, although the maximum force provided by the motor 10 is larger than the maximum force Wmax. If that is the case, the motor 10 automatically stops. In this embodiment, before the stoppage of the motor 10 rotation, the motor 10 is rotated reversely to retract the driver 105 to avoid the stoppage of the motor.

In FIG. 10, reference $a_1$ indicates the time period from the start of the driver 105 to the arrival thereof on the surface of the sheet S; $a_2$ indicates the time period during which the staple 109a is penetrating the sheets S; $a_3$, $a_4$ and $a_5$ are time periods from the penetration of the leading edges of the legs of the staple 109a through the sheets S to the start of the bending action by the anvil 9; and $a_6$ the time period required for the channel shaped staple 109a is bent flat by the anvil 9.

Figure 11:
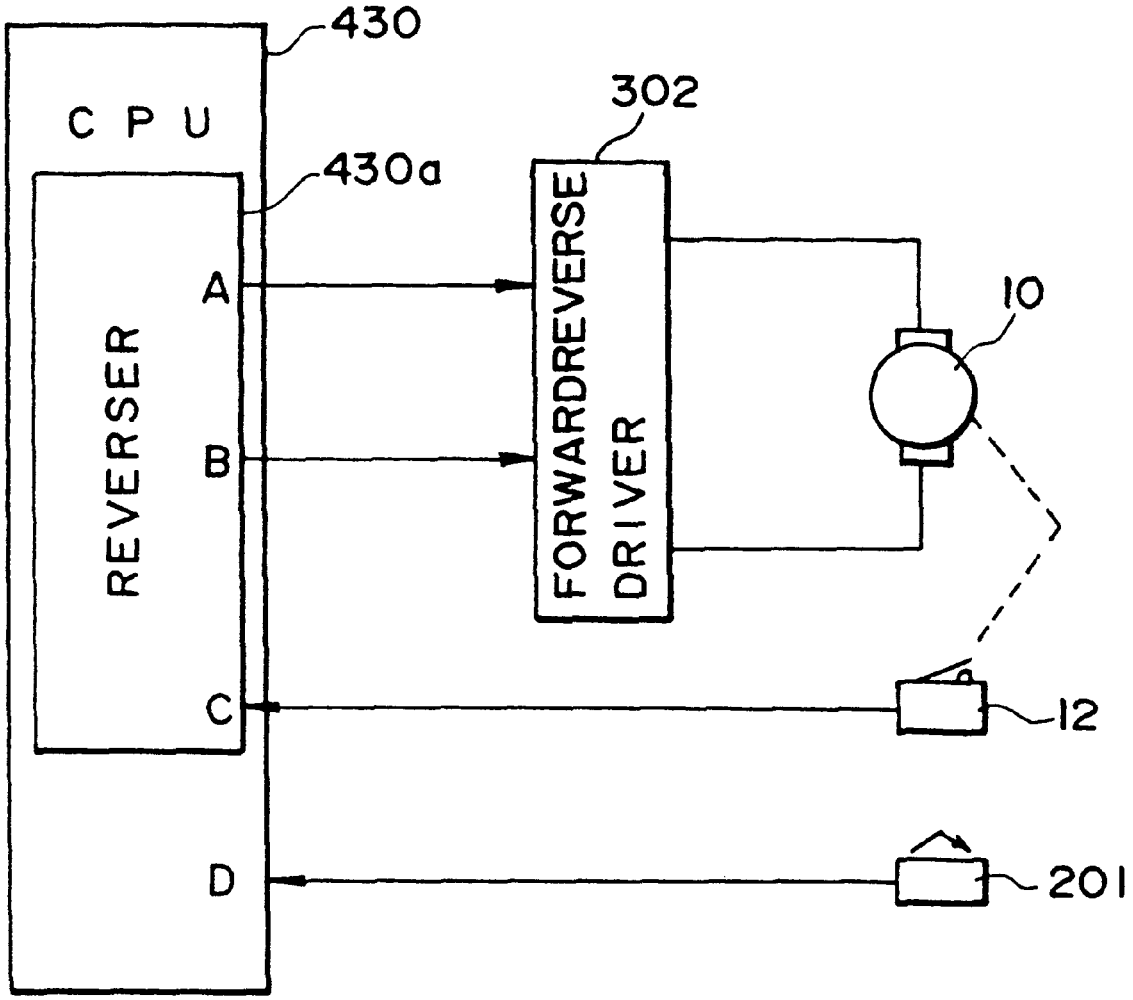
FIG. 11 is a block diagram illustrating the control system for the stapler.

Referring to FIG. 11, there is shown an electric circuit block diagram of the stapler according to this embodiment of the present invention. The control section includes a known microcomputer (CPU) 30 containing a program for sequential control and means 430a for reversing the driver. The terminals A, B, C and D thereof are connected to a forward-reverse driver 302, a microswitch 12 and staple detecting sensor 201 or the like. The terminals A and B are output terminals for supplying to the motor 10 a signal for rotating the forward-reverse driver 302. When the output of the terminal A is produced, the motor 10 is rotated forwardly to execute the normal stapling operation, whereas when the output terminal B is produced, a reverse operation is performed. When the driver 105 is at a stand-by position, the microswitch 12, which is a home position sensor, is closed, and the signal thereof is inputted to the terminal C. The forward-reverse driver 302 is constituted such that irrespective of whether the motor 10 is rotated forwardly and reversely, it is instantaneously stopped in response to actuation of the microswitch 12. When the motor is stopped, the lower jaw 2 is always at the bottommost position shown in FIG. 9. By this, the stapling operation is assured, and the easiness of the recovery manipulation after the reverse rotation is assured. To the terminal D a signal from the staple detecting sensor 201 is supplied.

Figure 12:
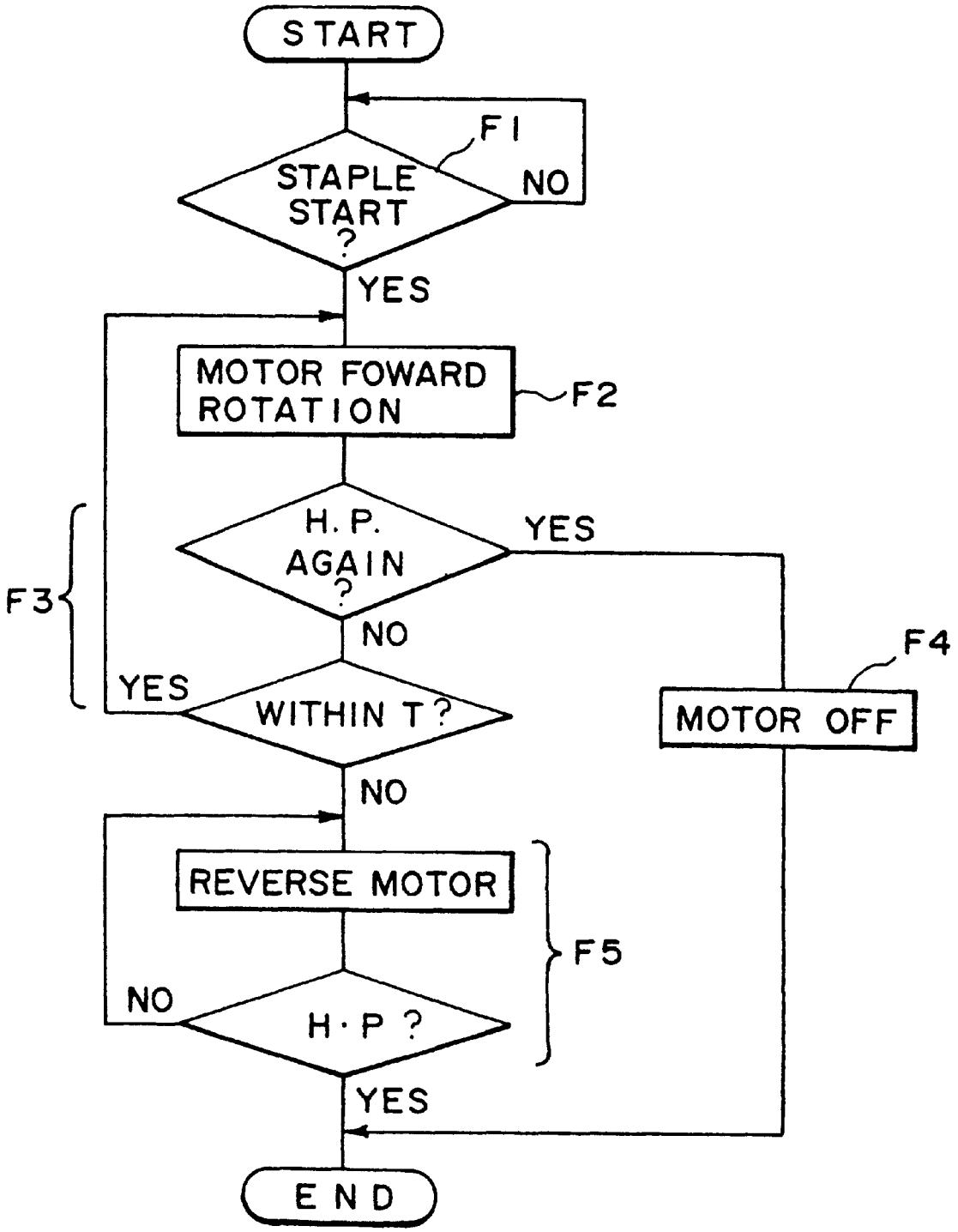
FIGS. 12 and 13 are flow charts illustrating the operation of the stapler.

Referring to FIG. 12 which is a flow chart, operation of the present embodiment will be described. When the start of the stapling operation is detected (F1), a forward rotation signal is supplied to the motor 12, so that the motor 10 rotates forwardly (F2). The motor 10 drives the stapler gear 7, and the driver 105 is moved to the stapling position by the driving force of the motor 10, where a staple 109a is shot to staple the sheets S, and thereafter, the driver 105 is returned to the stand-by position. During this, using a sensor cam 13 rotating in synchronism with the stapler gear 7, the discrimination is made as to whether or not it rotates from the home position (stand-by position) for actuating the microswitch 12 and rotates through one full turn to return to the home position within a predetermined period of time (0.8 sec, for example) (F3). If so, that is, if it has returned within the predetermined period of time T, the motor 10 is stopped, and the operation is terminated in the normal manner (F4). If not, that is, if the sensor cam 13 does not reach the home position even after the passage of the predetermined period T, the motor 10 is rotated reversely to return the driver 105 to the home position, that is, to return the sensor cam 13 to its home position (F5).

The speed of the reverse rotation of the motor 10 is not required to be so high as in the stapling operation, but may be lower than that of the forward rotation.

When the driver 105 does not return to the stand-by position due to some failure in the motor or the like even if the reverse rotation of the motor 10 is instructed, the motor 10 is stopped, and a trouble signal is produced to stop the stapler.

This embodiment has been described as a general electric stapler, but it is applicable to a finisher or sorter with a stapler which is connected to a copying machine, for example, to automatically staple the sheets.

In this embodiment, the overload of the motor 10 is detected on the basis of the time duration required for one cycle of the stapling operation, but this is not limiting and it is a possible alternative that the current through the driver such as a motor when it drives the stapler is detected, and if it is higher than a predetermined current, the overload of the driver is deemed as occurring, in response to which the driver is reversed. A further alternative is that the hammer mechanism for hammering the staple, for example, a plunger or the like is provided with a pressure sensor or the like, and when pressure exceeds a tolerable level, the driver is rotated reversely.

Figure 13:
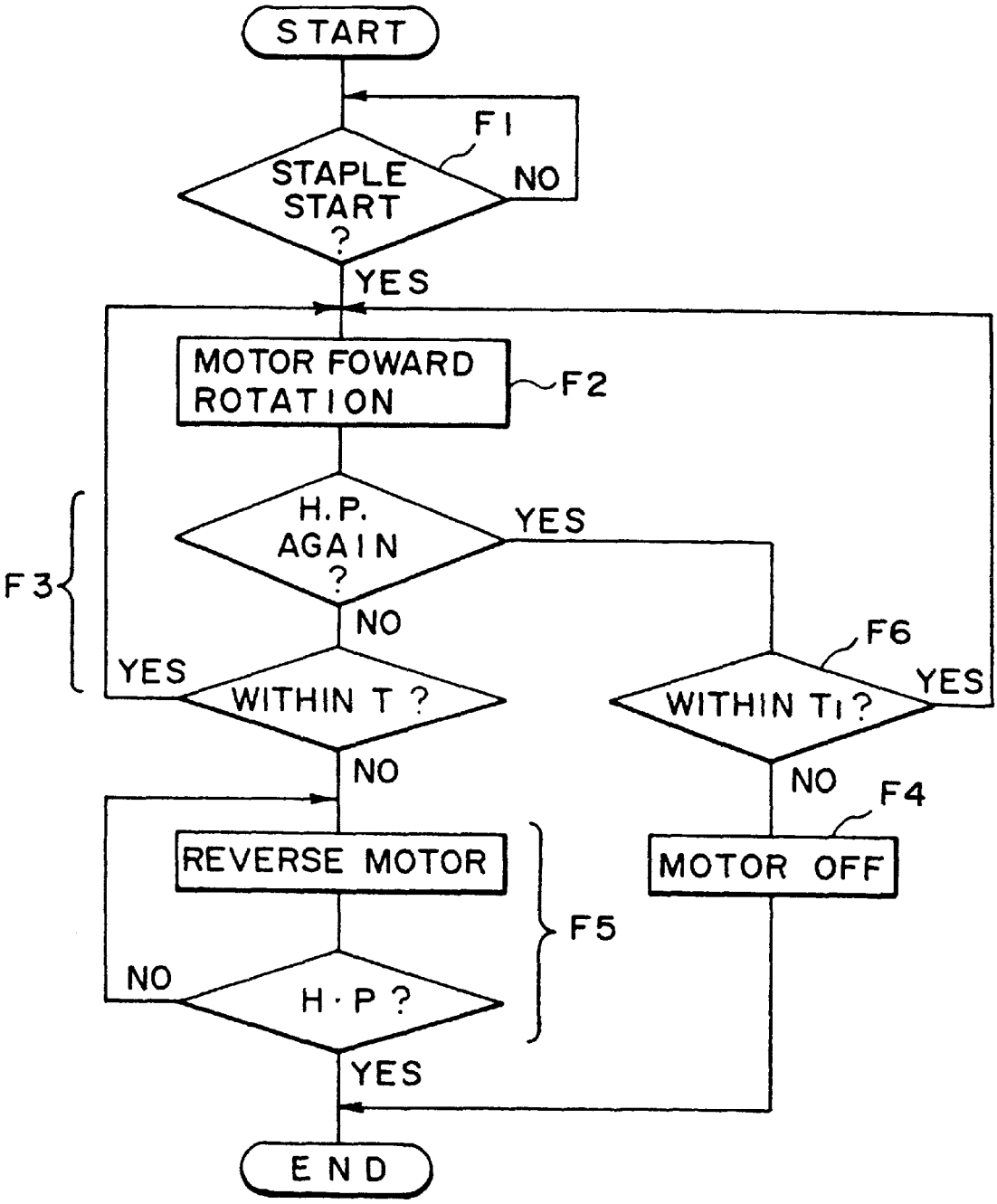

Referring to FIG. 13, an example will be described wherein the blank shot is discriminated using an earlier return of the sensor cam 13 to the home position, and if it occurs, the stapling operation is repeated. In FIG. 13, the motor is rotated forwardly (F2), and when it returns to its home position (F3), the discrimination is made as to whether or not the time required for the start of the forward rotation of the motor to the home position is within a predetermined duration T1. If so, it is deemed that the blank shot occurs, and therefore, the sequence goes back to F2, where the stapling operation is performed.

Figure 14:
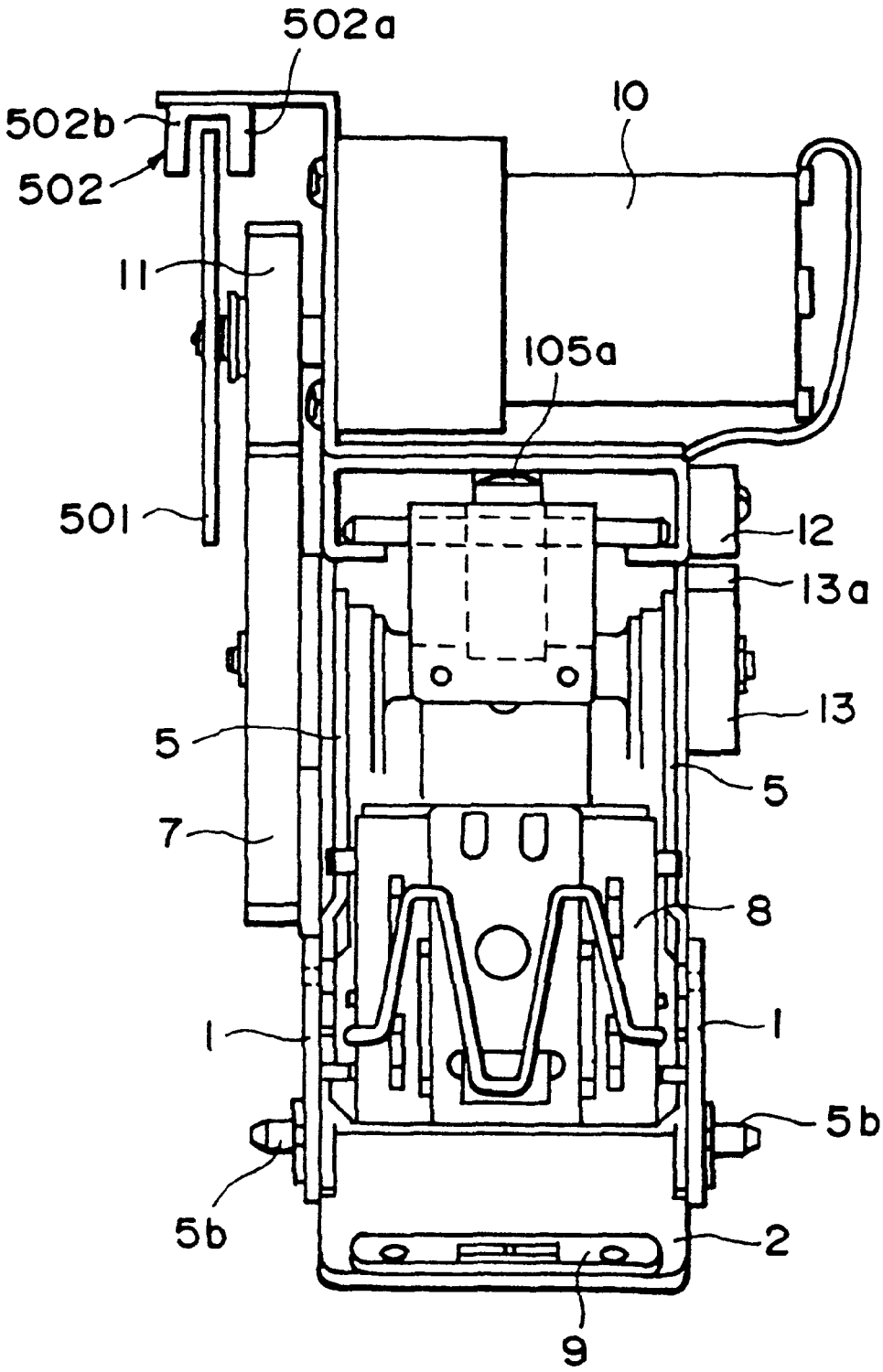
FIG. 14 shows structures of a stapler according to a further embodiment of the present invention.

FIG. 14 shows another embodiment for detecting trouble in the stapler. In this embodiment, as shown in FIG. 14, a disk is fixed to a shaft of the motor gear 11 and has slits at regular circumferential intervals. A photosensor 502 is constituted by a light emitting element 502a and a receiving element 502b and serve to detect passages of the slits by the rotation of the disk synchronized with the motor gear 11.

Figure 15:
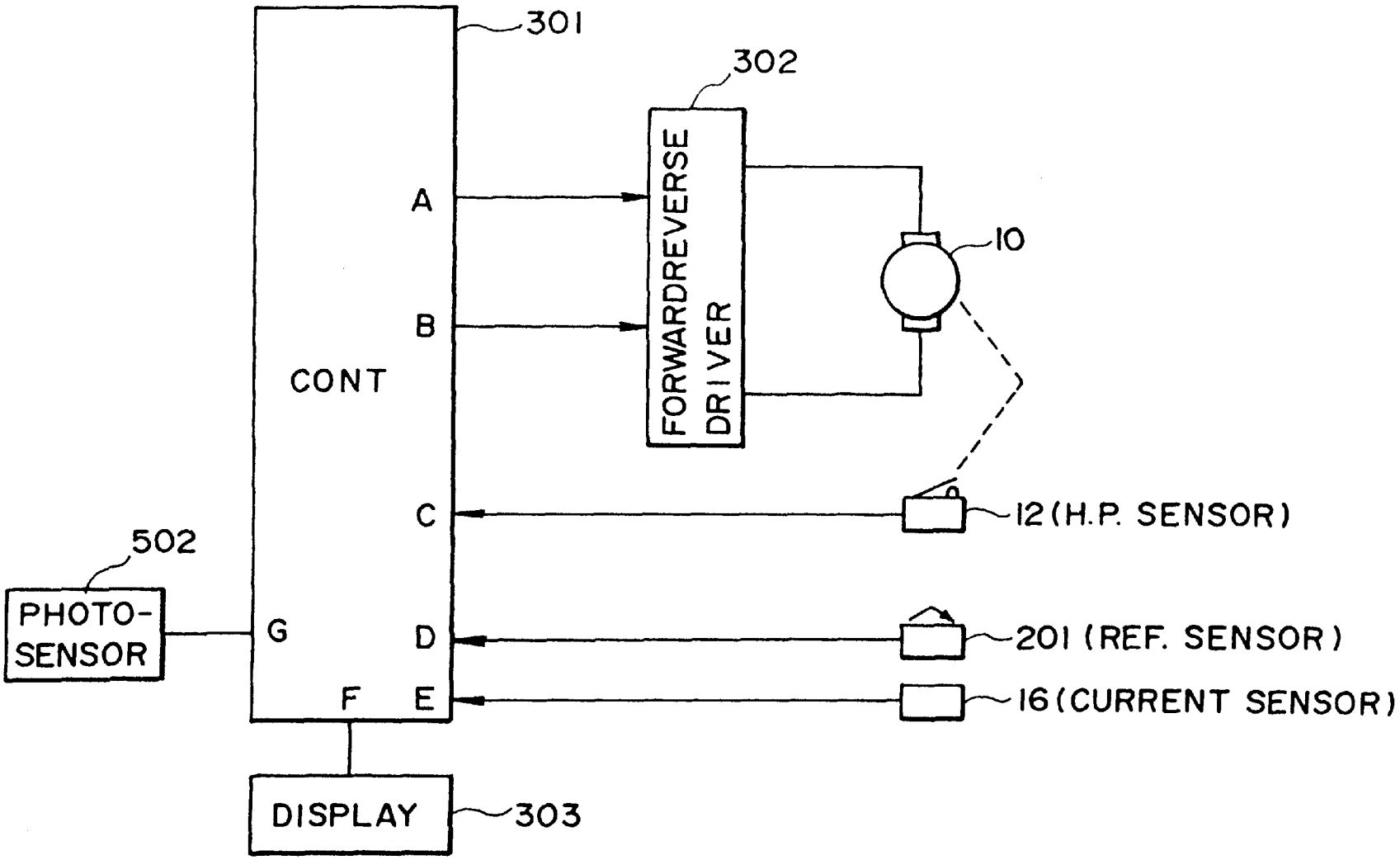
FIG. 15 is a block diagram of a control system of the stapler.

FIG. 15 is a block diagram of this example. The control circuit 301 determines the rotational speed of the motor gear 11 on the basis of the time intervals between the signals indicative of passage of slits, transmitted from the photosensor 502.

Figure 16:
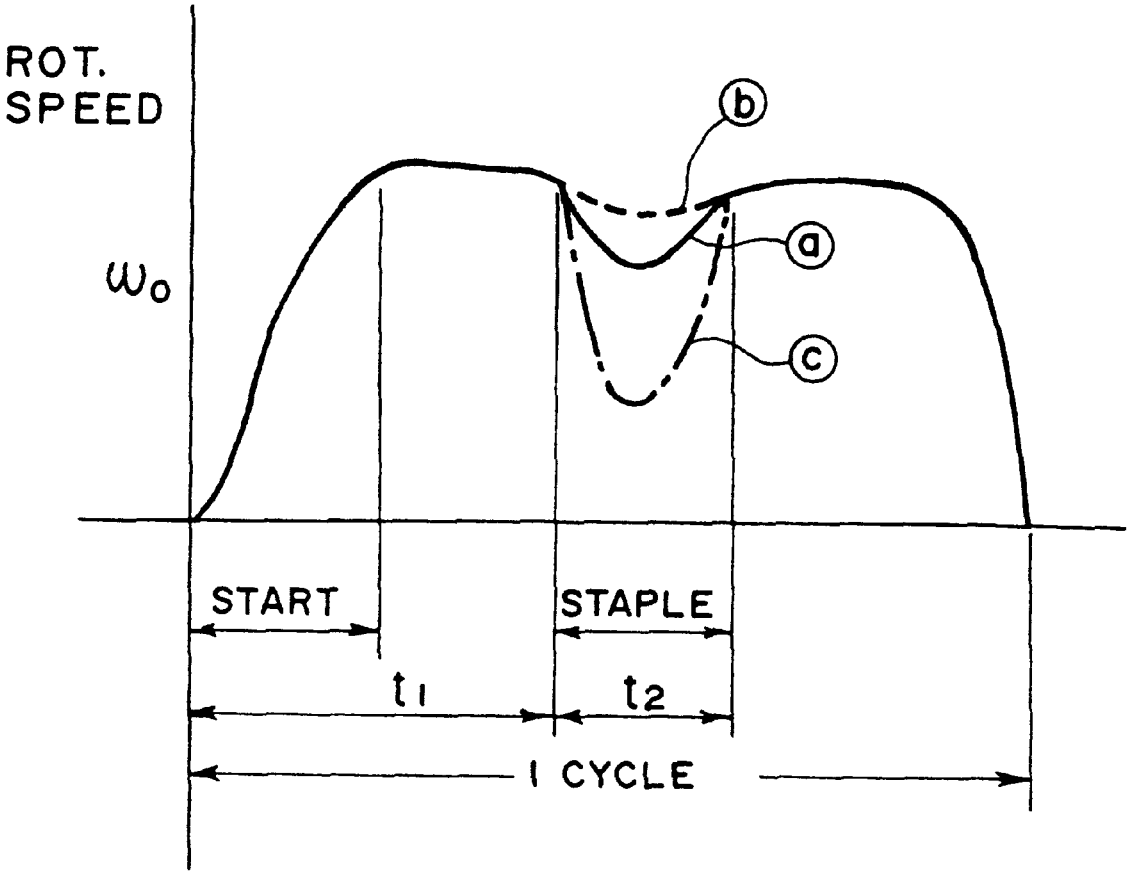
FIG. 16 is a graph showing a speed in the stapling operation of the stapler.

FIG. 16 shows a change of the rotational speed of the motor gear 11 with time, calculated on the basis of the signal from the photosensor 502 by the control circuit 301. In this Figure, "a" indicates a waveform when the staple is dispensed, is penetrated through the sheets and is bent without trouble; and "b" indicates a waveform when the blank shot occurs (the staple is not dispensed even if the stapler is operated). Upon the blank shot, there is no load applied for penetrating through the sheet or for bending the staple, and therefore, the reduction of the rotational speed during the period indicated by $t_2$. If malfunction or staple jam occurs, an overload is generally produced with the result that the rotational speed extremely decreases during the period $t_2$ as shown by a reference c, even to such an extent that the motor stops.

In this embodiment, when the rotational speed ωp at the maximum load is about a predetermined level $\omega_O$, it is deemed that the correct stapling operation is performed. When $\omega_p<\omega_O-C1$ (C1: variation). there is a possibility that the staple is jammed, that a malfunction occurs or that something is wrong with the stapling mechanism. On the other hand, when $\omega_p>\omega_O+C2$, it is discriminated that the blank shot has occurred.

Figure 17:
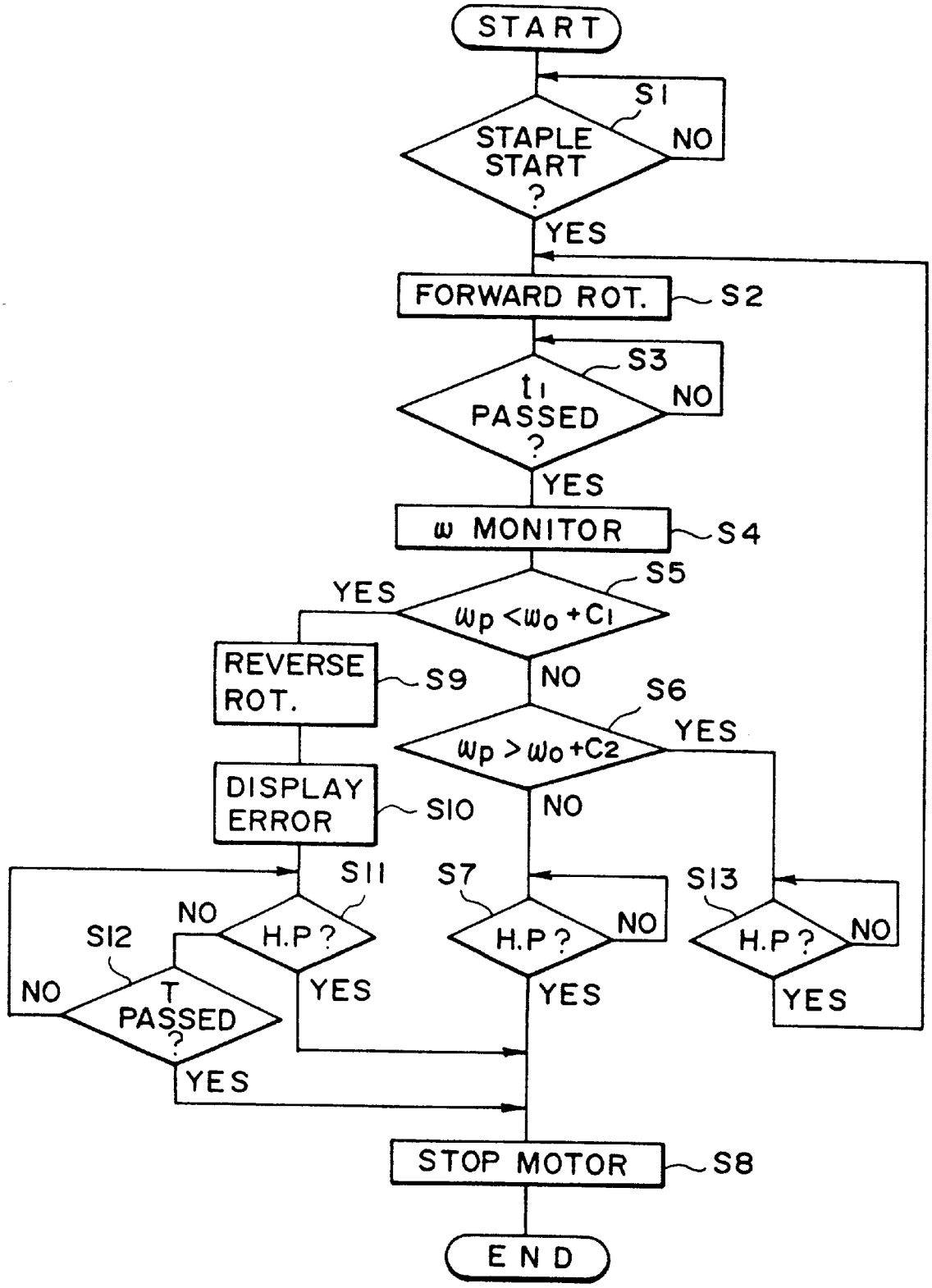
FIG. 17 is a flow chart illustrating the operation of the stapler.

FIG. 17 is a flow chart illustrating the operation of this example. At step S4 of FIG. 17, the rotational speed ω of the motor gear 11 is monitored. When $\omega_{p<\omega O}-C1$, which means that the load is extremely large, it is deemed that staple jam or the like is discriminated at step S5. Therefore, the motor 10 is rotated reversely, at step S9. When, on the other hand, $\omega_p>\omega_O+C2$, which means that the load is extremely small, it is discriminated that the blank shot occurs, at step S6. Therefore, the stapling operation is repeated. The flow chart of this figure is the same as of FIG. 7 with the exception of the above described steps.

In the embodiment of FIG. 14, the load is discriminated on the basis of the rotation of speed of the stapling gear 11, but it may be discriminated using a rotational speed of any drive transmitting part between the motor 10 and the driver 105.

When the driving source or the driver transmission involve a linear movement, as in a solenoid, the load is detected on the basis of the linear movement.

Alternatively, the load may be detected on the basis of variation in the acceleration, since increase of the load produces deceleration or negative acceleration in the movement of the stapler. Therefore, the negative acceleration is detected, and if it is beyond a normal range, the staple jam or blank shot or the like may be discriminated.

While the invention has been described with reference to the structures disclosed herein, it is not confined to the details set forth and this application is intended to cover such modifications or changes as may come within the purposes of the improvements or the scope of the following claims.

What is claimed is:

1. A sheet stapling apparatus, comprising:

stapling means, movable from a home position to a stapling position, for stapling a set of sheets, said stapling means including a hammer for driving a staple into the set of sheets;

driving means for driving said stapling means toward the stapling position, said driving means including an electrical driving means for supplying power to said hammer;

load detecting means for detecting a current load of said electrical driving means during a stapling operation, and for generating a signal when the load detected by said load detecting means is outside of a predetermined level; and control means for controlling said driving means to move said stapling means toward the home position when the load detected by said load detecting means is not less than a predetermined level, wherein said load detecting means detects the level of the load by detecting a level of current through said electrical driving means.

2. An apparatus according to claim 1, wherein said load detecting means produces the signal when the current is not higher than the predetermined level.

3. An apparatus according to claim 2, further comprising feeding means for feeding staples toward said stapling means in a feeding operation in response to each stapling operation by said stapling means, and wherein said control means is responsive to a signal generated by said load detecting means and repeats the stapling operation by said stapling means and the feeding operation by said feeding means.

4. A sheet stapling apparatus, comprising:

stapling means for stapling a set of sheets, said stapling means including a hammer movable from a home position to a staple position for driving a staple into the set of sheets, and driving means for driving said hammer, said driving means including an electrical driving means for supplying power to said hammer [and being driven by a predetermined current];

load detecting means for detecting a [current] load of said electrical driving means during a stapling operation, and for generating a signal when the load detected by said load detecting means is over [the] *a* predetermined [current] *limit*; and control means for controlling movement of said driving means to *perform reverse driving of said hammer to* return said hammer to the home position when said detecting means generates the signal.

5. An apparatus according to claim 4, wherein said detecting means includes a detector for detecting the load on the basis of a stapling speed of said stapling means, and for discriminating that the [current] load is a light load without a staple, when the stapling speed is higher than a predetermined level.

6. An apparatus according to claim 4, wherein said detecting means includes a detector for detecting the load on the basis of stapling acceleration of said stapling means, and for discriminating that the [current] load is a light load without a staple, when the stapling acceleration is higher than a predetermined level.

7. An apparatus according to claim 4, wherein said detecting means includes means for detecting the load on the basis of an end of one cycle of operation of said stapling means and for discriminating that the [current] load is a light load without a staple, when the end of one cycle occurs within a predetermined period.

8. An apparatus according to claim 4, wherein said detecting means detects an [overloaded current] *overload* on the basis of stapling speed of said stapling means, and discriminates [that] the [current is overloaded] *overload* when the stapling speed is lower than a predetermined level.

9. An apparatus according to claim 4, wherein said detecting means detects an [overloaded current] *overload* on the basis of stapling acceleration of said stapling means, and discriminates [that] the [current is overloaded] *overload* when the stapling acceleration is lower than a predetermined level.

10. An apparatus according to claim 4, wherein said detecting means detects an [overloaded current] *overload* on the basis of an end of one cycle of operation of said stapling means and discriminates [that] the [current is overloaded] *overload* when the end of one cycle does not occur within a predetermined period.

11. A sheet stapling apparatus, comprising:

stapling means for stapling a set of sheets, said stapling means including a hammer movable from a home position to a staple position for driving a staple into the set of sheets, and driving means for driving said hammer, said driving means including an electrical driving means for supplying power to said hammer [and being driven by a predetermined current];

detecting means for detecting a light [current] load of said electrical driving means when a [current] *load* applied to said electrical driving means is less than [the] *overload* predetermined [current] *limit* during a stapling operation *by the arrival of said hammer to the home position within a predetermined time*;and control means for controlling said driving means to [return] *repeat the stapling operation after* said hammer *returns* to the home position, when said detecting means detects a light load, and then repeating the stapling operation.

12. An apparatus according to claim 11, wherein said detecting means includes a detector for detecting the load on the basis of a stapling speed of said stapling means, and for discriminating that the [current] load is a light load without a staple, when the stapling speed is higher than a predetermined level.

13. An apparatus according to claim 11, wherein said detecting means includes a detector for detecting the load on the basis of stapling acceleration of said stapling means, and for discriminating that the [current] load is a light load without a staple, when the stapling acceleration is higher than a predetermined level.

14. An apparatus according to claim 11, wherein said detecting means includes means for detecting the load on the basis of an end of one cycle of operation of said stapling means, and for discriminating that the [current] load is a light load without a staple, when the end of one cycle occurs within a predetermined period.

15. An apparatus according to claim 11, wherein said detecting means detects an overloaded [current] of said stapling means when a current applied to said electrical driving means is higher than the predetermined current during a stapling operation of said stapling means, and wherein said control means controls said driving means to return said hammer to the home position when the overloaded current is detected.

16. A sheet stapling apparatus, comprising:

stapling means, reciprocable between a home position and a stapling position, for stapling a set of sheets, with said stapling means including a hammer for driving a staple into the set of sheets;

driving means for reciprocating said stapling means in a direction toward the stapling position, said driving means including an electrical driving means for supplying power to said hammer;

load detecting means for detecting a current load of said electrical driving means during a stapling operation and for generating a signal when the load detected by said load detecting means is outside of a predetermined level, control means for controlling said driving means to move said stapling means toward the home position when the load detected by said load detecting means is not less than a predetermined level, wherein said load detecting means detects the current load by detecting either one of the level of current and a voltage of said electrical driving means.

17. A sheet stapling apparatus, comprising:

stapling means for stapling a set of sheets, with said stapling means including a hammer reciprocable between a home position and a stapling position for driving a staple, and driving means for reciprocating said hammer in a direction toward the stapling position, said driving means including an electrical driving means for supplying power to said hammer and being driven by a predetermined current;

detecting means for detecting an overloaded current of said electrical driving means when a current applied to said electrical driving means is higher than the predetermined current during a stapling operation; and control means for controlling said driving means to return said hammer to the home position when said detecting means detects the overload.

18. A sheet stapling apparatus for use with a sorter coupled with a copying machine, comprising:

stapling means, movable from a home position to a stapling position, for stapling a set of sheets, said stapling means including a hammer for driving a staple into the set of sheets;

driving means, including an electrical driving means for supplying power to said hammer, for driving said stapling means;

load detecting means for detecting a current load of said electrical driving means during a stapling operation, and for generating a signal when the load detected by said load detecting means is outside of a predetermined level; and control means for controlling said driving means to move said stapling means toward the home position when the load detected by said load detecting means is not less than a predetermined level, wherein said load detecting means detects the current load by detecting either one of a level of a current and a voltage of said electrical driving means.

19. A sheet stapling apparatus for use with a sorter coupled with a copying machine, comprising:

stapling means for stapling a set of sheets, said stapling means including a hammer movable from a home position to a stapling position for driving a staple into the set of sheets, and driving means for driving said hammer, said driving means including an electrical driving means for supplying power to said hammer and being driven by a predetermined current;

detecting means for detecting an overloaded current of said electrical driving means when a current applied to said electrical driving means is higher than the predetermined current during a stapling operation; and control means for controlling said driving means to return said hammer to the home position when said detecting means detects the overload.

20. A sheet stapling apparatus for use with a sorter coupled with a copying machine, comprising:

stapling means for stapling a set of sheets, said stapling means including a hammer movable from a home position to a stapling position for driving a staple into the set of sheets, and driving means for driving said hammer, said driving means including an electrical driving means for supplying power to said hammer and being driven by a predetermined current;

detecting means for detecting a light current load of said electrical driving means when a current applied to said electrical driving means is less than the predetermined current during a stapling operation; and control means for controlling said driving means to return said hammer to the home position when said detecting means detects the light load, and then repeating the stapling operation.

21. In a sorter coupled with a copying machine and having an automatic sheet stapling apparatus comprising:

stapling means, movable from a home position to a stapling position, for stapling a set of sheets including a hammer for driving a staple into the set of sheets;

driving means, including an electrical driving means for supplying power to said hammer, for driving said stapling means;

load detecting means for detecting a current load of said electrical driving means during a stapling operation, and for generating a signal when the load detected by said load detecting means is outside of a predetermining level; and control means for controlling said driving means to move said stapling means toward the home position when the load detected by said load detecting means is not less than a predetermined level, wherein said load detecting means detects the current load by detecting either one of a level of a current and a voltage of said electrical driving means.

22. In a sorter coupled with a copying machine and having an automatic sheet stapling apparatus comprising:

stapling means for stapling a set of sheets, said stapling means including a hammer movable from a home position to a stapling position for driving a staple into the set of sheets, and driving means for driving said hammer, said driving means including an electrical driving means for supplying power to said hammer and being driven by a predetermined current:

detecting means for detecting an overloaded current of said electrical driving means when a current applied to said electrical driving means is higher than the predetermined current during a stapling operation; and control means for controlling said driving means to return said hammer to the home position when said detecting means detects the overload.

23. In a sorter coupled with a copying machine and having an automatic sheet stapling apparatus comprising:

stapling means for stapling a set of sheets, said stapling means including a hammer movable from a home position to a stapling position for driving a staple into the set of sheets, and driving means for driving said hammer, said driving means including an electrical driving means for supplying power to said hammer and being driven by a predetermined current;

detecting means for detecting a light current load of said electrical driving means when a current applied to said electrical driving means is less than the predetermined current during a stapling operation; and control means for controlling said driving means to return said hammer to the home position when said detecting means detects the light load, and then repeating the stapling operation.

24. In a finisher coupled with a copying machine and having an automatic sheet stapling apparatus comprising:

stapling means, movable from a home position to a stapling position, for stapling a set of sheets, said stapling means including a hammer for driving a staple into the set of sheets;

driving means, including an electrical driving means for supplying power to said hammer, for driving said stapling means;

load detecting means for detecting a current load of said electrical driving means during a stapling operation, and for generating a signal when the load detected by said load detecting means is outside a predetermined level; and control means for controlling said driving means to move said stapling means toward the home position when the load detected by said load detecting means is not less than a predetermined level, wherein said load detecting means detects the current load by detecting either one of a level of a current and a voltage of said electrical driving means.

25. In a finisher coupled with a copying machine and having an automatic sheet stapling apparatus comprising:

stapling means for stapling a set of sheets, said stapling means including a hammer movable from a home position to a stapling position for driving a staple into the set of sheets, and driving means for driving said hammer, said driving means including an electrical driving means for supplying power to said hammer and being driven by a predetermined current;

detecting means for detecting an overloaded current of said electrical driving means when a current applied to said electrical driving means is higher than the predetermined current during a stapling operation; and control means for controlling said driving means to return said hammer to the home position when said detecting means detects the overload.

26. In a finisher coupled with a copying machine and having an automatic sheet stapling apparatus comprising:

stapling means for stapling a set of sheets, said stapling means including hammer movable from a home position to a stapling position for driving a staple into the set of sheets, and driving means for driving said hammer, said driving means including an electrical driving means for supplying power to said hammer and being driven by a predetermined current;

detecting means for detecting a light current load of said electrical driving means when a current applied to said electrical driving means is less than the predetermined current during a stapling operation thereby; and control means for controlling said driving means to return said hammer to the home position when said detecting means detects the light load, and then repeating the stapling operation.

27. In a sorter coupled with a copying machine and having a sheet stapling apparatus, comprising:

stapling means for stapling a set of sheets, said stapling means including a hammer movable from a home portion to a stapling position for driving a staple into the set of sheets, And driving means for driving said hammer, said driving means including an electrical driving means for supplying power to said hammer and being driven [by] *according to* a predetermined [current]*limit*;

load detecting means for detecting a [current] load of said electrical driving means during a stapling operation, and for generating a signal when the load detected by said load detecting means is over the predetermined [current]*limit*;and control means for controlling movement of said driving means to return said hammer to the home position when said detecting means generates the signal.

28. An apparatus according to claim 27, wherein said detecting means detects an [overloaded current] *overload* on the basis of an end of one cycle of operation of said stapling means and discriminates [that] the [current is overloaded] *overload* when the end of one cycle does not occur within a predetermined period.

29. In a finisher coupled with a copying machine and having a sheet stapling apparatus, comprising:

stapling means for stapling a set of sheets, said stapling means including a hammer movable from a home position to a staple position for driving a staple into the set of sheets, and driving means for driving said hammer, said driving means including an electrical driving means for supplying power to said hammer and being driven [by] *according to* a predetermined [current]*limit*;

load detecting means for detecting a [current] load of said electrical driving means during a stapling operation, and for generating a signal when the load detected by said load detecting means is over the predetermined [current]*limit*; and control means for controlling movement of said driving means to return said hammer to the home position when said detecting means generates the signal.

30. An apparatus according to claim 29, wherein said detecting means detects an [overloaded current] *overload* on the basis of an end of one cycle of operation of said stapling means and discriminates [that the current is overloaded] *the*

*overload* when the end of one cycle does not occur within a predetermined period.

*31. A sorter according to claim 27, wherein said load detecting means detects the load of the electrical driving means on the basis of the angular acceleration of said driving means.*

*32. A sorter according to claim 27, wherein said load detecting means detects the load of said electrical driving means on the basis of the electrical current used by said electrical driving means.*

*33. A finisher according to claim 29, wherein said load detecting means detects the load of the electrical driving means on the basis of the angular acceleration of said driving means.*

*34. A finisher according to claim 29, wherein said load detecting means detects the load of said electrical driving means on the basis of the electrical current used by said electrical driving means.*

* * * * *

UNITED STATES PATENT AND TRADEMARK OFFICE

CERTIFICATE OF CORRECTION

PATENT NO. : Re 36,923
DATED : October 24, 2000
INVENTOR(S) : Masakazu Hiroi, et al.

It is certified that error appears in the above-identified patent and that said Letters Patent is hereby corrected as shown below:

Column 1,
Line 30, "to" should read -- too --.

Column 2,
Line 25, "so" should be deleted.

Column 6,
Line 56, "ca not" should read -- cannot --.

Column 10,
Line 50, "than" should read -- than a --.
Line 51, "*overload*" should be deleted.

Column 14,
Line 25, "portion" should read -- position --.

Signed and Sealed this

Thirtieth Day of October, 2001

*Attest:*

Nicholas P. Godici

NICHOLAS P. GODICI
*Acting Director of the United States Patent and Trademark Office*

*Attesting Officer*